(12) United States Patent
Närhi et al.

(10) Patent No.: US 11,471,975 B1
(45) Date of Patent: Oct. 18, 2022

(54) SPIRAL LASER WELDING METHODS FOR JOINING METAL

(71) Applicant: Corelase Oy, Tampere (FI)

(72) Inventors: Matti Närhi, Lempäälä (FI); Henri Pajukoski, Kangasala (FI)

(73) Assignee: Corelase Oy, Tampere (FI)

( * ) Notice: Subject to any disclaimer, the term of this patent is extended or adjusted under 35 U.S.C. 154(b) by 0 days.

(21) Appl. No.: 17/338,109

(22) Filed: Jun. 3, 2021

(51) Int. Cl.
 *B23K 26/28* (2014.01)
 *B23K 26/073* (2006.01)
 *B23K 26/06* (2014.01)
 *B23K 103/10* (2006.01)
 *B23K 26/0622* (2014.01)
 *B23K 101/34* (2006.01)

(52) U.S. Cl.
 CPC .......... *B23K 26/28* (2013.01); *B23K 26/0608* (2013.01); *B23K 26/0613* (2013.01); *B23K 26/0622* (2015.10); *B23K 26/0626* (2013.01); *B23K 26/0734* (2013.01); *B23K 2101/34* (2018.08); *B23K 2103/10* (2018.08)

(58) Field of Classification Search
 CPC ............................ B23K 26/28; B23K 26/0608; B23K 26/0626; B23K 26/0734; B23K 26/0736; B23K 2103/10; B23K 2103/34
 USPC .................................................... 219/121.64
 See application file for complete search history.

(56) References Cited

U.S. PATENT DOCUMENTS

| | | | |
|---|---|---|---|
| 10,118,249 B2 | 11/2018 | Solomon et al. | |
| 10,286,491 B2 | 5/2019 | Nakagawa et al. | |
| 10,688,595 B2 | 6/2020 | Yang et al. | |
| 10,807,190 B2 | 10/2020 | Salokatve et al. | |
| 2018/0009060 A1* | 1/2018 | Yang | B23K 26/0626 |
| 2019/0118299 A1 | 4/2019 | Kangastupa | |
| 2020/0101563 A1 | 4/2020 | Tao et al. | |
| 2020/0254562 A1* | 8/2020 | Brescoe | B23K 26/0626 |
| 2021/0362271 A1* | 11/2021 | Brescoe | B23K 26/0626 |

OTHER PUBLICATIONS

Cao et al., (2003). "Research and Progress in Laser Welding of Wrought Aluminum Alloys. II. Metallurgical Microstructures, Defects, and Mechanical Properties," Materials and Manufacturing Processes, 18:23-49.

* cited by examiner

*Primary Examiner* — John J Norton
*Assistant Examiner* — Simpson A Chen
(74) *Attorney, Agent, or Firm* — Morrison & Foerster LLP

(57) ABSTRACT

Laser welding methods include focusing laser radiation onto a first metal sheet disposed on a metal part, optionally with one or more intervening metal sheets therebetween. The laser radiation is steered to trace at least one spiral path to spot-weld together the metal parts. The laser radiation includes a center beam and an annular beam to maintain a stable keyhole. One method is tailored to weld aluminum parts, e.g., with high gas content and/or dissimilar compositions, and the laser radiation traces first an outward spiral path and then an inward spiral path. The center beam is pulsed during one segment of the inward spiral path. Another method is tailored to weld steel or copper parts having a coating at an interface therebetween, and the laser radiation traces an inward spiral path. The interface may be a zero-gap interface, or a non-zero gap may exist.

12 Claims, 6 Drawing Sheets

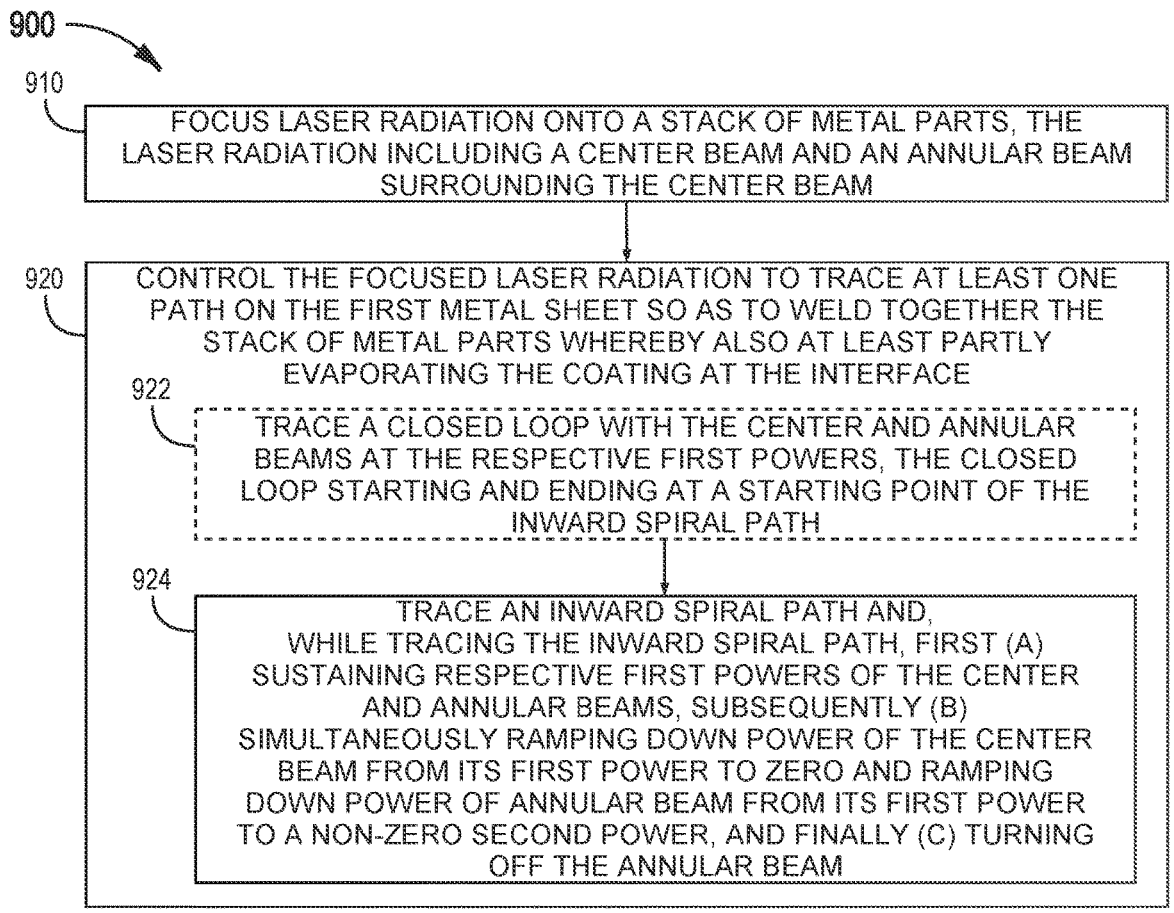
FIG. 9
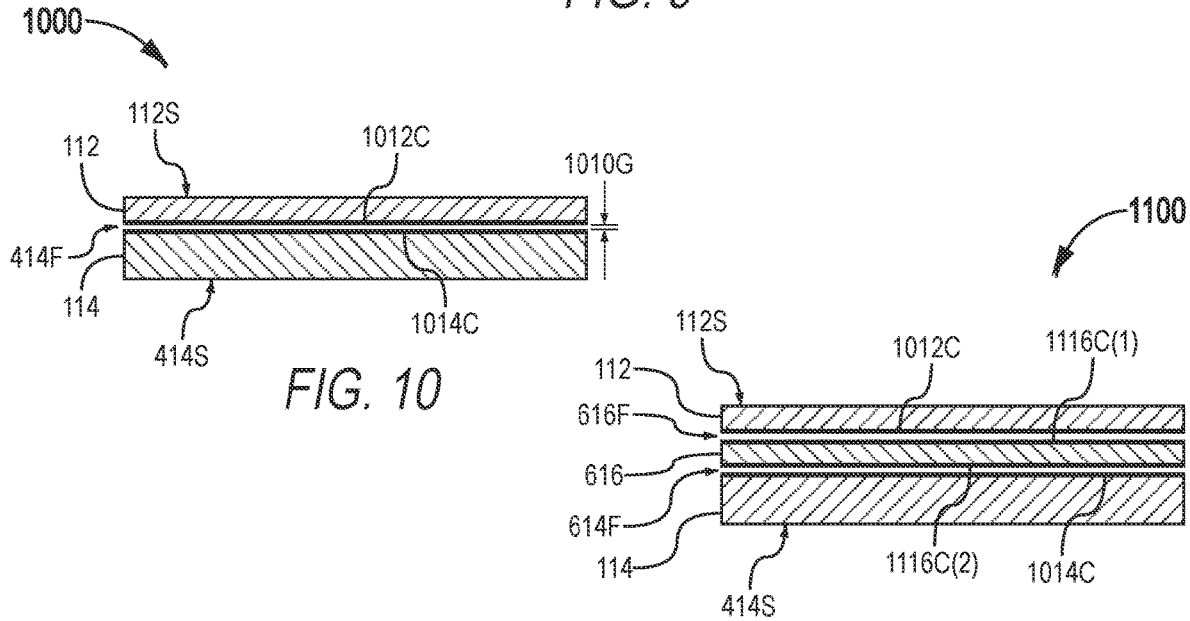
FIG. 10
FIG. 11

SPIRAL LASER WELDING METHODS FOR JOINING METAL

TECHNICAL FIELD OF THE INVENTION

The present invention relates in general to laser welding of metal sheets, in particular metal sheets with challenging material compositions.

DISCUSSION OF BACKGROUND ART

Laser welding uses a laser beam as a concentrated heat source to locally melt and join two parts, typically made of metal. The laser beam may be focused to a relatively small spot, resulting in a high power density and small heat-affected zone. Laser welding is therefore an attractive technique when accuracy and a high degree of control is required. Furthermore, laser welding lends itself well to automation.

In laser welding, the focused laser beam locates each weld spot or line precisely, while minimizing collateral heating. It is useful to distinguish two main laser welding regimes. Conduction welding occurs at lower laser powers and lower laser power densities. Absorbed laser power heats the irradiated material, thereby melting material in each part to be joined, which flows, mixes, and then solidifies. Keyhole welding occurs at higher laser powers and higher laser power densities that are sufficient to vaporize some of the irradiated material. Pressure of the vaporized material on surrounding melted material opens a channel through the melted material. This channel, known in the art as a keyhole, has a characteristic narrow and deep profile, which allows deep penetration of the laser beam. Finished keyhole welds are generally narrower, deeper, and stronger than conduction welds.

Laser welding has been successfully applied to a wide range of welding problems involving a variety of materials arranged in a variety of configurations. In some instances, laser welding replaces another welding technique. In other instances, laser welding enables welding of structures not suitable for welding by conventional, non-laser welding techniques.

The automotive industry is one of several manufacturing industries that are increasingly adopting laser welding. In the automotive industry, laser welding is currently used to weld many different vehicle parts, such as chassis, body frames, doors, engine parts, and batteries (for electric and hybrid vehicles). With the benefit of a small heat-affected zone and a generally well-controlled and finely tunable process, laser welding may be used to automatically and reliably weld thinner and smaller parts than when using conventional welding techniques. Laser welding has thus helped advance auto manufacturing technology to meet the demands for lighter and more efficient vehicles. For example, laser welding facilitates accurate welding of lightweight body parts, as well as connections within and to electrochemical batteries (e.g., connections between metal foil stacks and battery tabs, and connections between battery tabs and bus bars). In the case of body parts, the welded materials are typically steel, aluminum, and/or aluminum alloys. In the case of batteries, the welded materials often include copper but can also include aluminum or aluminum alloys.

Spot welding is one of numerous welding styles that may be used to laser weld overlapping parts. When spot laser-welding together two overlapping parts, the laser beam is incident on one of the parts and locally melts through this part, all the way to the interface with the second part, and at least some distance into the second part. Spot laser-welding may be applied to stacks of two, three, or more metal parts. Keyhole welding has been shown to form strong spot-weld joints in many scenarios. To form a larger spot weld than can be achieved with a stationary laser beam, the laser beam may be steered to trace a spiral pattern.

SUMMARY OF THE INVENTION

Disclosed herein are spiral laser-welding methods configured to spot-weld together a stack of metal parts by tracing spiral-shaped patterns with dual-beam laser radiation. The dual-beam laser radiation is incident on the metal stack from one side and melts through the stack to reach the most-distant metal part. The metal parts may be a stack of two or more metal sheets. Alternatively, the most-distant metal part of the stack, farthest from the side of the stack that receives the laser radiation, may be a thicker, non-sheet-like metal structure.

The presently disclosed methods utilize keyhole welding and are specifically tailored to achieve a strong weld joint in certain particularly challenging scenarios. Although keyhole welding is effective at melting and mixing material, the quality of the resulting weld joint can be compromised by issues such as entrapped gas, cooling rate discrepancies, and material loss due to spatter.

Spatter is an undesirable effect in keyhole welding where the convection in the keyhole is sufficiently violent that metal droplets are ejected during the welding process. This ejection of droplets reduces the volume of the weld nugget in a poorly controlled fashion.

Gas in the melt pool potentially imposes several problems. The presence of gas bubbles in the melt pool may cause spatter. When gas remains trapped during the final cooling process, residual stresses caused by the presence of entrapped gas may lead to cracking in the weld joint. If not released before or during cooling, the entrapped gas forms substantially sized voids and/or smaller pores in the resulting weld nugget.

Cooling rate discrepancies are particularly likely to occur when dissimilar materials are welded together. When laser welding parts of identical or similar materials, a true metallurgical bond between the parts may be formed at the weld joint and the material composition of the weld nugget is relatively uniform. When laser welding dissimilar materials, it may not be possible to form metallurgical bonds between the different materials. Instead, the weld may contain a mix of the two materials. When the mix is non-uniform, any substantial cooling-rate discrepancy between the two materials may lead to stress-induced cracking upon cooling of the melt pool.

Cracking, voids, porosity, and material loss may compromise the strength of the weld joint. In addition, in scenarios where the welded structure is intended to carry electrical current, for example in battery applications, the conductivity of the weld joint may be adversely affected by these effects.

In the present methods, laser welding is performed by dual-beam laser radiation that includes two beams: a center beam and annular beam surrounding the center beam. The respective powers of the center and annular beams are controlled independently of each other to achieve the desired outcome. This dual-beam laser radiation can maintain a more stable and well-controlled keyhole than a single laser beam. The greater stability of the present keyhole simultaneously (a) minimizes spatter and (b) maximizes the duration of the keyhole being open and thereby capable of facilitating release of entrapped gas. The present methods trace the dual-beam laser radiation along spiral-shaped patterns to reliably create a strong weld joint with minimal entrapped gas and minimal (or no) cracks, even in scenarios involving materials otherwise prone to gas-entrapment and cracking. Also for the purpose of avoiding or at least minimizing cracking, the methods conclude with a controlled laser-power ramp-down while moving toward the center of the spiral pattern.

Benefitting from the above-mentioned process features, the present methods are capable of welding dissimilar metals, metals with entrapped gas, and metals with coatings that evaporate during the welding process. One method is tailored to weld together aluminum parts with entrapped gas and traces the same region with both an outward spiral and an inward spiral, with pulsing of the center beam along a portion of the inward spiral, in order to properly release entrapped gas. The aluminum parts may be of dissimilar compositions. Another method traces an inward spiral and is tailored to weld coated metal parts, such as zinc-coated steel or nickel-coated copper. Conventional laser-welding methods struggle to reliably produce a good weld joint in the presence of such coatings, especially when there is no gap between the parts. The present method reliably achieves a high-quality weld joint even for zero-gap configurations. In fact, the weld-joint quality of the present method is essentially insensitive to the gap size, within the range extending from zero gap up to gaps of, for example, about 0.5 millimeters or possibly more, depending on the thickness of the parts.

In one aspect, a laser welding method for joining aluminum includes steps of focusing laser radiation onto a first aluminum sheet disposed on an aluminum part, and controlling the focused laser radiation to trace a plurality of paths on the first aluminum sheet so as to weld the first aluminum sheet to the aluminum part. The laser radiation includes a center beam and an annular beam surrounding the center beam. The controlling step includes tracing an outward spiral path while sustaining respective first powers of the center and annular beams. The outward spiral path starts at a central location and spirals about and away from the central location. The controlling step further includes, after tracing the outward spiral path, tracing an outer path while ramping down powers of the center and annular beams from the respective first powers to respective second powers. The outer path is peripheral to the spiral path as viewed from the central location. In addition, the controlling step includes, after tracing the outer path, tracing an inward spiral path toward the central location while first (a) ramping up the powers of the center and annular beams from the respective second powers to respective third powers, subsequently (b) sustaining the third power of the annular beam and repeatedly pulsing the center beam between its third power and a lower fourth power, and finally (c) turning off the center beam and ramping down the power of the annular beam to zero.

In another aspect, a laser welding method for joining a stack of metal parts having a coating at an interface includes focusing laser radiation onto the stack of metal parts, and controlling the focused laser radiation to trace at least one path on a first metal sheet of the stack of metal parts so as to weld together the stack of metal parts whereby also at least partly evaporating the coating at the interface. The metal parts include (i) the first metal sheet, (ii) a most-distant metal part, and (iii) zero, one, or several intervening metal sheets between the first metal sheet and the metal part. At least one of the metal parts has a coating at an interface with a neighboring metal part. The interface is configured with direct contact between the two neighboring metal parts or with a gap therebetween. The laser radiation is incident on the first metal sheet and includes a center beam and an annular beam surrounding the center beam. The controlling step includes tracing an inward spiral path, and, while tracing the inward spiral path, first (a) sustaining respective first powers of the center and annular beams, subsequently (b) simultaneously ramping down power of the center beam from its first power to zero watts and ramping down power of the annular beam from its first power to a non-zero second power, and finally (c) turning off the annular beam.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

FIG. 9 is a flowchart for a method for joining metal parts that include a coating thereon at an interface therebetween, according to an embodiment. This method uses spiral laser welding with the dual-beam laser radiation of FIG. 2.

FIG. 10 illustrates an example of a two-layer stack of metal parts that may be welded by the method of FIG. 9.

FIG. 11 illustrates an example of a stack of metal parts, with more than two layers, that may be welded by the method of FIG. 9.

DETAILED DESCRIPTION OF THE INVENTION

Figure 1:
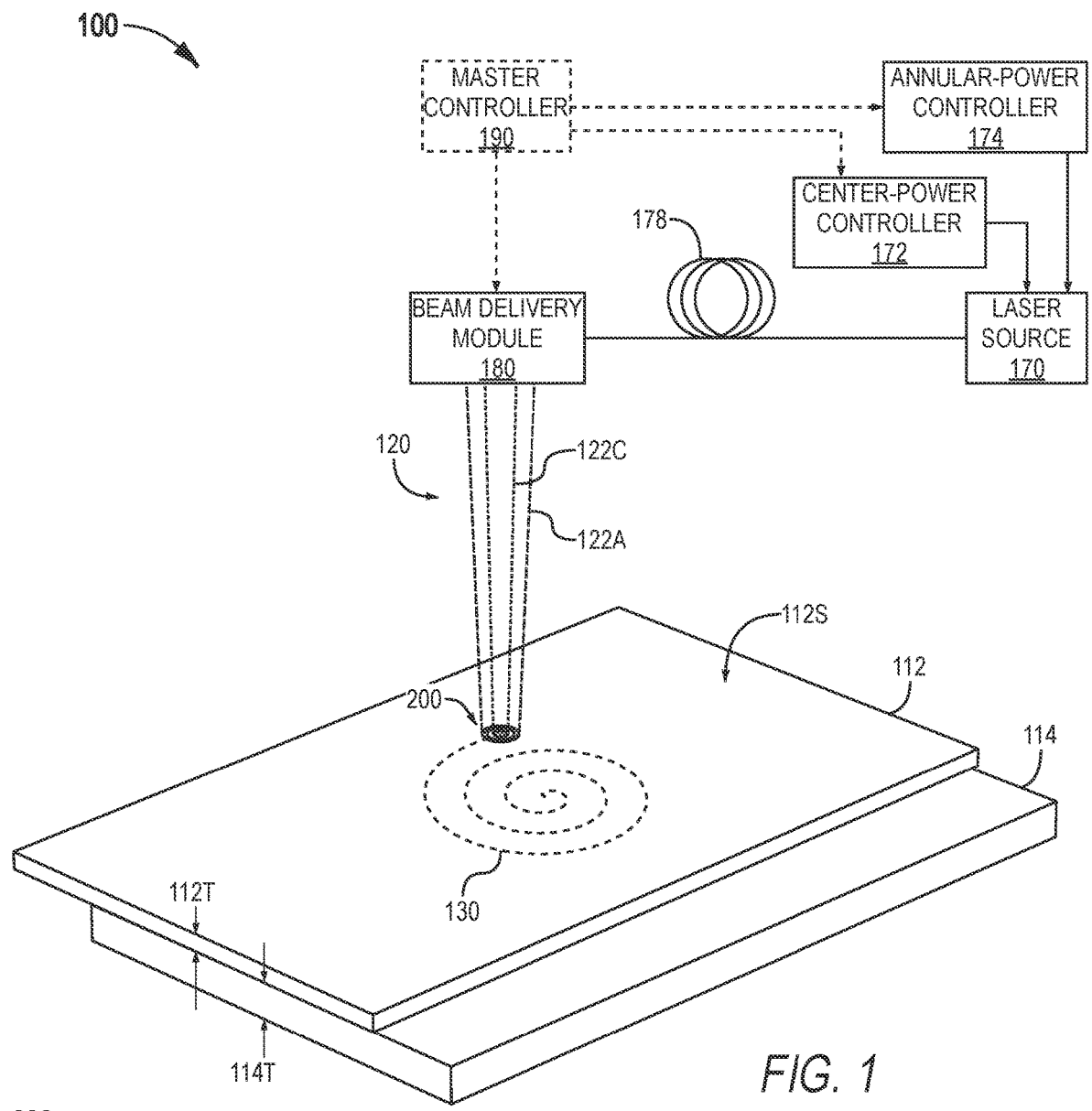
FIG. 1 illustrates a laser welding apparatus for welding metal parts with dual-beam laser radiation, according to an embodiment.

Referring now to the drawings, wherein like components are designated by like numerals, FIG. 1 schematically illustrates one laser welding apparatus 100 for welding metal parts. Apparatus 100 is configured to focus dual-beam laser radiation 120 onto a target and trace one or more paths, such as a spiral path 130, on the target.

In the scenario depicted in FIG. 1, apparatus 100 welds together two overlapping metal parts: a metal sheet 112 and a metal part 114. Herein, the term metal sheet refers to a metal part with a thickness that is no greater than 10 millimeters, such that focused laser radiation with an average power in the kilowatt range can melt through the thickness. The term metal sheet, as used herein, includes metal foils with thicknesses less than 100 micrometers, as well as metal parts that are not flat. The term metal sheet, as used herein, also refers to local sheet-like portions of metal parts that have one or more other portions that are thicker than 10 millimeters. Thus, the thickness 112T of metal sheet 112 is 10 millimeters or less. While joining of metal parts 112 and 114 by welding requires that laser radiation 120 melts through the thickness 112T of metal sheet 112, it is not necessary to melt through the thickness 114T of metal part 114. Therefore, metal part 114 may or may not be a metal sheet, and thickness 114T may or may not exceed 10 millimeters.

Figure 2:
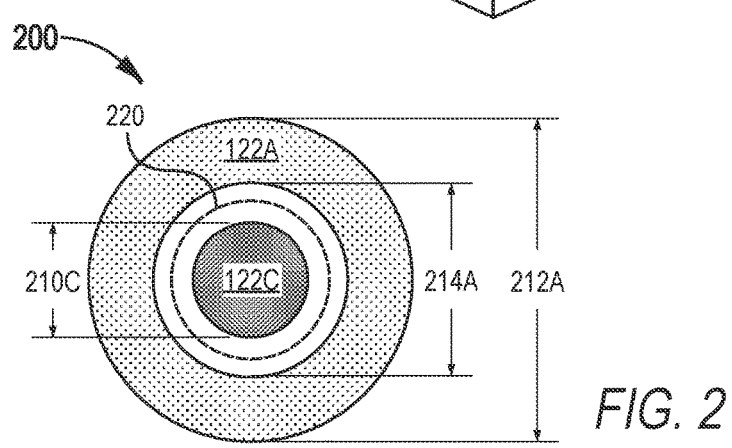
FIG. 2 shows the transverse laser profile of the laser radiation generated by the apparatus of FIG. 1 as focused on a target, according to an embodiment.

FIG. 2 shows the transverse profile 200 of laser radiation 120 as focused on a target, for example as focused on metal sheet 112 as depicted in FIG. 1. Laser radiation 120 includes a center beam 122C and an annular beam 122A that surrounds center beam 122C. At least the majority of the power of annular beam 122A is outside the diameter of center beam 122C. In the embodiment depicted in FIG. 2, center beam 122C and annular beam 122A are circular. The following discussion assumes circular beams, but is readily extended to elliptical beams. Center beam 122C has a $1/e^2$-diameter 210C. Annular beam 122A has an outer $1/e^2$-diameter 212A and an inner $1/e^2$-diameter 214A. Inner diameter 214A of annular beam 122A exceeds diameter 210C of center beam 122C. The combined power of center beam 122C and annular beam 122A attains a minimum along a circle 220 that is outside diameter 210C of center beam 122C and inside inner diameter 214A of annular beam 122A. In one example, diameter 210C is in the range between 50 and 500 micrometers, and outer diameter 212A is in the range between two and three times diameter 210C. In another example, diameter 210C is in the range between 15 and 50 micrometers, and outer diameter 212A is in the range between four and ten times diameter 210C. Laser radiation 120 may be near-infrared, for example with a wavelength in the range between 900 and 1200 nanometers.

Referring again to FIG. 1, apparatus 100 includes a laser source 170, a center-power controller 172, an annular-power controller 174, an optical fiber 178, and a beam delivery module 180. Laser source 170 generates laser radiation. Laser source 170 couples one portion of the generated laser radiation into a center core of optical fiber 178 to form center beam 122C, and another portion of the generated laser radiation into an annular core of optical fiber 178 to form annular beam 122A. For the purposes of coupling laser radiation from laser source 170 into optical fiber 178, apparatus 100 may implement fiber coupling techniques similar to those discussed in U.S. Pat. No. 10,807,190 and U.S. Patent Application Publication No. US 2019/0118299, both of which are incorporated by reference herein in their entireties.

Center-power controller 172 adjusts the power of center beam 122C as needed. Annular-power controller 174 adjusts the power of annular beam 122A as needed. In one implementation, laser source 170 includes at least one laser that is controlled by center-power controller 172 and dedicated to generate center beam 122C, and at least one other laser that is controlled by annular-power controller 174 and dedicated to generate annular beam 122A.

Beam delivery module 180 receives laser radiation 120 from optical fiber 178. Beam delivery module 180 focuses laser radiation 120 onto the target and steers laser radiation 120 as needed, for example to trace spiral path 130. Beam delivery module 180 steers center beam 122C and annular beam 122A together as a whole and does not need to be capable of spatially manipulating center beam 122C and annular beam 122A independently of each other. Beam delivery module 180 may include a focusing lens or objective, and beam steering optics as known in the art.

Apparatus 100 may further include a master controller 190 that manages the operation of center-power controller 172, annular-power controller 174, and beam delivery module 180. Master controller is, for example, a computer containing machine-readable instructions specifying operations to be performed by center-power controller 172, annular-power controller 174, and beam delivery module 180.

In the scenario depicted in FIG. 1, beam delivery module 180 focuses laser radiation 120 onto a surface 112S of metal sheet 112. Surface 112S is on the opposite side of metal sheet 112 from metal part 114. Beam delivery module 180 traces one or more paths, including spiral path 130, with laser radiation 120. While beam delivery module 180 focuses and steers center beam 122C and annular beam 122A together, center-power controller 172 and annular-power controller 174 adjust the respective powers of center beam 122C and annular beam 122A independently of each other as needed to weld together metal sheet 112 and metal part 114. For example, the power of center beam 122C may be ramped up or down at a different rate than the power of annular beam 122A, or center beam 122C may be pulsed or turned off while annular beam 122A is on continuously.

Figure 3:
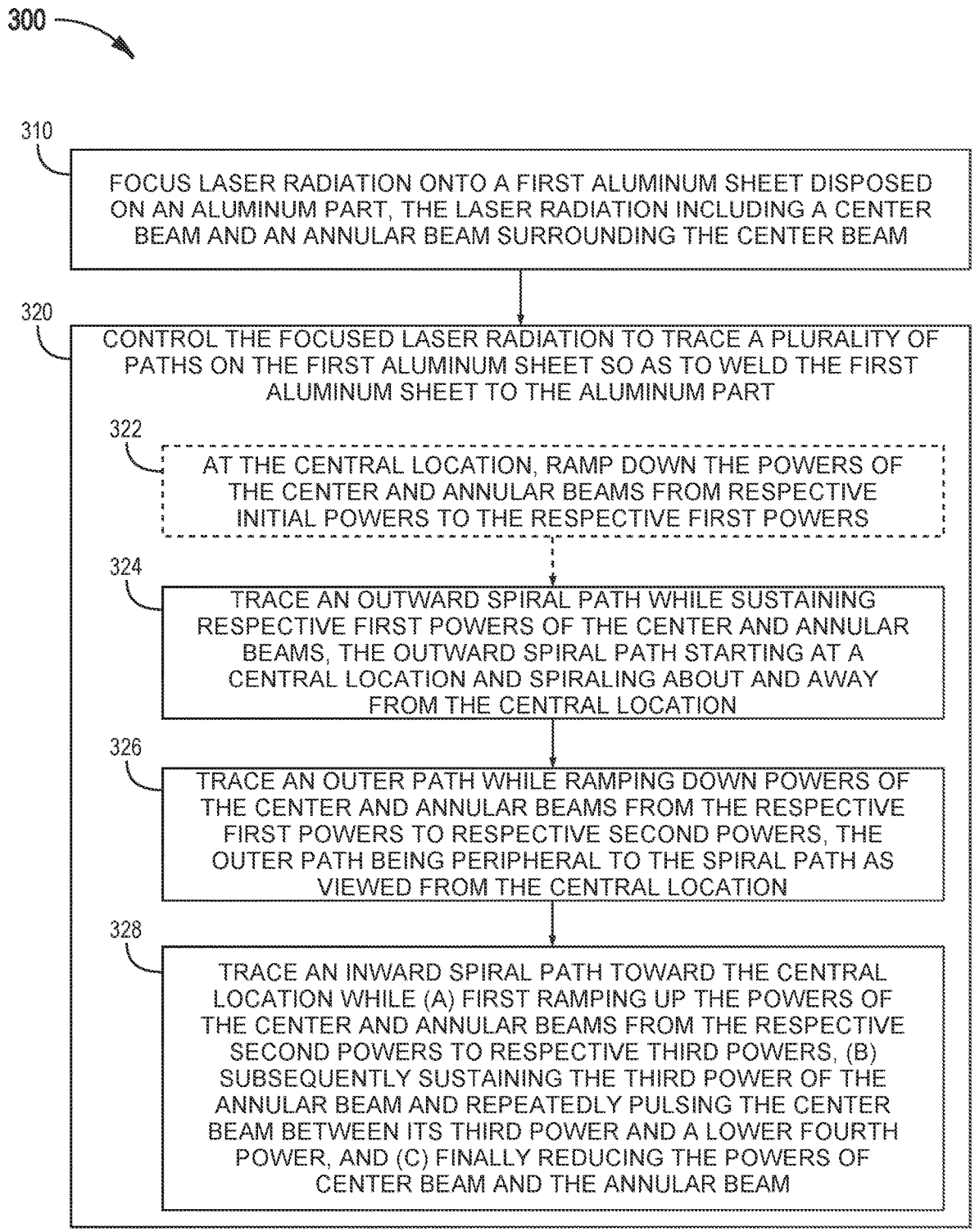
FIG. 3 is a flowchart for a method for joining aluminum using spiral laser welding with the dual-beam laser radiation of FIG. 2, according to an embodiment.

FIG. 3 is a flowchart for one method 300 for joining aluminum using spiral laser welding with dual-beam laser radiation 120. Method 300 may be performed by apparatus 100 and may be used to weld an aluminum sheet to one or more other aluminum sheets and/or to another aluminum part. Each aluminum sheet/part is made substantially of aluminum or an aluminum alloy. Without departing from the scope hereof, surfaces may exhibit some degree of oxidization and/or contamination prior to welding.

Aluminum is relatively viscous when melted. Since aluminum generally contains some degree of trapped gas and the high viscosity impedes release of such gas, conventional laser welding of aluminum is particularly prone to produce weld nuggets with significant porosity and substantially-sized voids and also prone to spatter. Certain forms of aluminum, such as cast aluminum, tend to contain a relatively large amount of gas. Method 300 is tailored to optimize release of trapped gas. At least for this reason, method 300 is capable of forming high-quality, low-porosity weld joints between aluminum parts even when one or more of the parts has high gas content, such as when one or more of the parts is a cast aluminum part. For example, method 300 may be used to weld one or more extruded aluminum sheets to a cast aluminum part. In general, method 300 facilitates controlled release of entrapped gas and minimizes stress, thereby minimizing spatter and porosity, as well as the risk of cracks forming during cooling.

Method 300 includes steps 310 and 320. Step 310 focuses laser radiation 120 onto a first aluminum sheet that is disposed on another aluminum part, optionally with one or more other, intervening aluminum sheets disposed therebetween. Step 320 controls laser radiation 120, as focused, to trace a plurality of paths on the first aluminum sheet and thereby weld the first aluminum sheet to the aluminum part (and the intervening aluminum sheets, if present).

Figure 4:
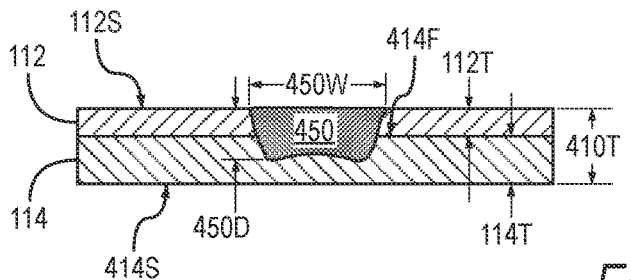
FIG. 4 shows an exemplary configuration of metal parts as laser welded by the method of FIG. 3. In this configuration, a metal sheet is disposed on a metal part with no other intervening metal sheets therebetween, and metal melting caused by the laser welding extends only partway into the metal part.
Figure 5:
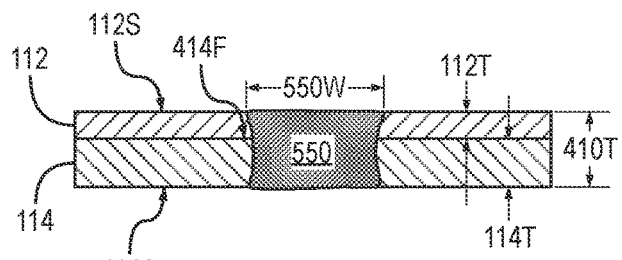
FIG. 5 shows another exemplary configuration of metal parts as laser welded by the method of FIG. 3. This configuration is similar to the FIG. 4 configuration except that metal melting extends all the way through the metal part.
Figure 6:
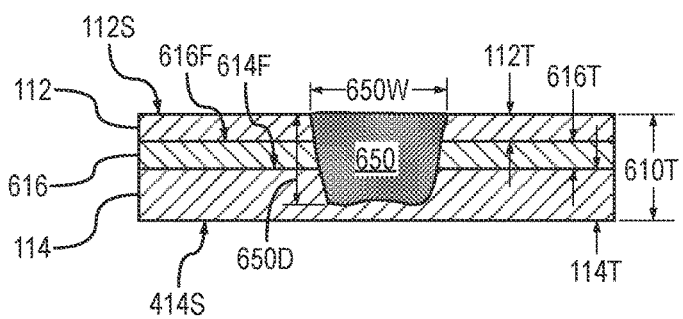
FIG. 6 shows yet another exemplary configuration of metal parts as laser welded by the method of FIG. 3. This configuration is similar to the FIG. 4 configuration except for including an intervening metal sheet.

Before proceeding to discuss the details of steps 310 and 320, we address different configurations of aluminum parts that may be welded by method 300. FIGS. 4, 5, and 6 illustrate example configurations of metal parts, to which method 300 may be applied, as well as example weld nuggets formed by method 300. Within the context of method 300, each of the metal parts shown in FIGS. 4, 5, and 6 is an aluminum part.

FIG. 4 shows a configuration 400, wherein metal sheet 112 is disposed on metal part 114 with no other, intervening metal sheets therebetween, and wherein metal melting caused by the performance of method 300 extends only partway into metal part 114. Metal sheet 112 may be in direct contact with metal part 114 along an interface 414F therebetween. Without departing from the scope hereof, small gaps may exist in places along interface 414F, for example due to positioning tolerances or non-flatness of surfaces. Metal part 114 has a surface 414S on the side of metal part 114 that is opposite interface 414F. Metal sheet 112 and metal part 114, as arranged in configuration 400, have a combined thickness 410T between surfaces 112S and 414S. In scenarios where metal sheet 112 and/or metal part 114 are non-planar, thickness 410T is a local thickness measured in the region where laser radiation 120 is incident on metal sheet 112 during welding.

When applying method 300 to configuration 400, method 300 directs laser radiation 120 onto surface 112S of metal sheet 112 to melt through metal sheet 112, across interface 414F, and into metal part 114, but not all the way through metal part 114 to surface 414S. Method 300 thereby forms a weld nugget 450 that starts at surface 112S and terminates within an interior portion of metal part 114, such that the depth 450D of weld nugget 450 is less than thickness 410T. Weld nugget 450 has a width 450W that may exceed depth 450D. For example, width 450W may be in the range between one and five times depth 450D. Since method 300, in configuration 400, does not seek to melt all the way through metal part 114 to surface 414S, thickness 414T of metal part 114 may substantially exceed thickness 112T of metal sheet 112, as long as the corresponding heat sink provided by metal part 114 does not prevent laser radiation 120 from melting across interface 414F. In one example of configuration 400, thickness 112T is in the range between one and five millimeters, thickness 114T is in the range between two and thirty millimeters, width 450W is between three and fifteen millimeters, and depth 450D extends into metal part 114 by at least one millimeter. Alternatively, depth 450D may extend into metal part 114 by less than one millimeter, for example when metal part 114 is relatively thin and it is preferred that surface 414S does not show signs of the welding process. Weld nugget 450 will typically be widest at or near surface 112S, such that width 450W is attained thereabout and the width of weld nugget 450 at interface 414F is somewhat smaller.

FIG. 5 shows a configuration 500 that is similar to configuration 400 except that metal melting, and the associated weld nugget 550, generated by the performance of method 300 extend all the way through metal part 114 to surface 414S. In configuration 500, metal part 114 may be a metal sheet with a thickness 114T that is similar to thickness 112T. The width 550W of weld nugget 550 may exceed thickness 410T. However, since only the perimeter of weld nugget 550 is supported by solid portions of metal sheet 112 and metal part 114 during laser welding, it may be preferable to limit width 550W to less than approximately three times thickness 410T. If width 550W is allowed to exceed this limit, laser radiation 120 may blow out substantial amounts of melted metal. Such blow-out may compromise the size and strength of weld nugget 550, and in a worst case even form an aperture extending through metal sheet 112 and metal part 114. In one example of configuration 500, each of thicknesses 112T and 114T is in the range between one and three millimeters, and width 550W is less than three times the resulting value of thickness 410T.

FIG. 6 shows a configuration 600 that is similar to configuration 400 except for including an intervening metal sheet 616 between metal sheet 112 and metal part 114. Metal sheet 616 has a thickness 616T that is similar to thickness 112T. Metal sheets 112 and 616 meet at an interface 616F, and metal sheet 616 and metal part 114 meet at an interface 614F. Each of interfaces 616F and 614F has properties similar to interface 414F. When method 300 is applied to configuration 600, laser radiation 120 melts through metal sheet 112, across interface 616F, through metal sheet 616, across interface 614F, and into metal part 114, but not all the way to surface 414S. The resulting weld nugget 650 terminates within an interior portion of metal part 114, and has a depth 650D that is less than the combined thickness 610T of metal sheets 112 and 616 and metal part 114 between surfaces 112S and 414S. In one example of configuration 600, each of thicknesses 112T and 616T is in the range between one and three millimeters, thickness 414T is in the range between two and thirty millimeters, and width 650W is between three and fifteen millimeters. The extent of depth 650D into metal part 114 may be similar to the extent of weld nugget 450 into metal part 114 in configuration 400.

Configuration 600 may be modified to metal melting, by method 300, that extends all the way through metal part 114 to surface 414S, in a manner similar to the modification of configuration 400 to arrive at configuration 500. Additionally, configuration 600 may be extended to include more than one intervening metal sheet 616 between metal sheet 112 and metal part 114.

Referring again to FIG. 3, in one example of step 310, laser source 170 generates laser radiation 120, and beam delivery module 180 focuses laser radiation 120, including center beam 122C and annular beam 122A, onto surface 112S of metal sheet 112 as arranged in any one of the configurations discussed above in reference to FIGS. 4, 5, and 6. In a related example of step 320, beam delivery module 180 steers laser radiation 120 to trace a plurality of paths on surface 112S with center beam 122C and annular beam 122A.

Figure 7:
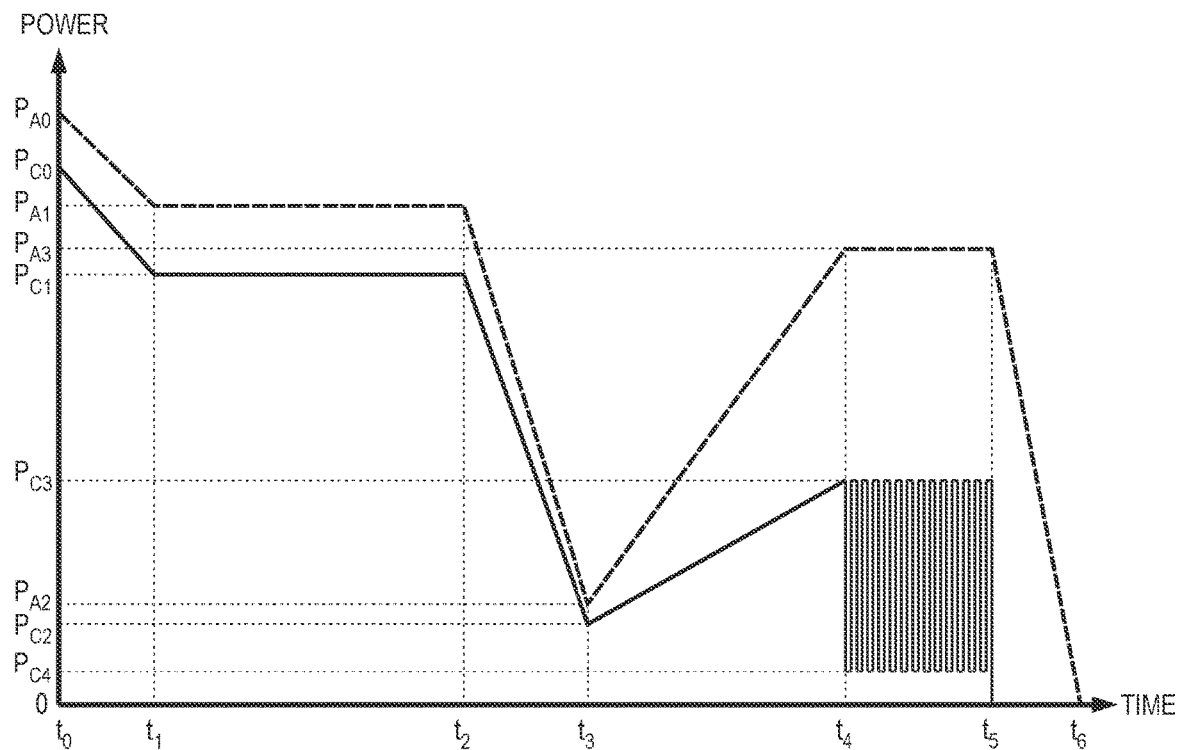
FIG. 7 shows a laser power scheme utilized in the method of FIG. 3, according to an embodiment.
Figures 8A, 8B, 8C:
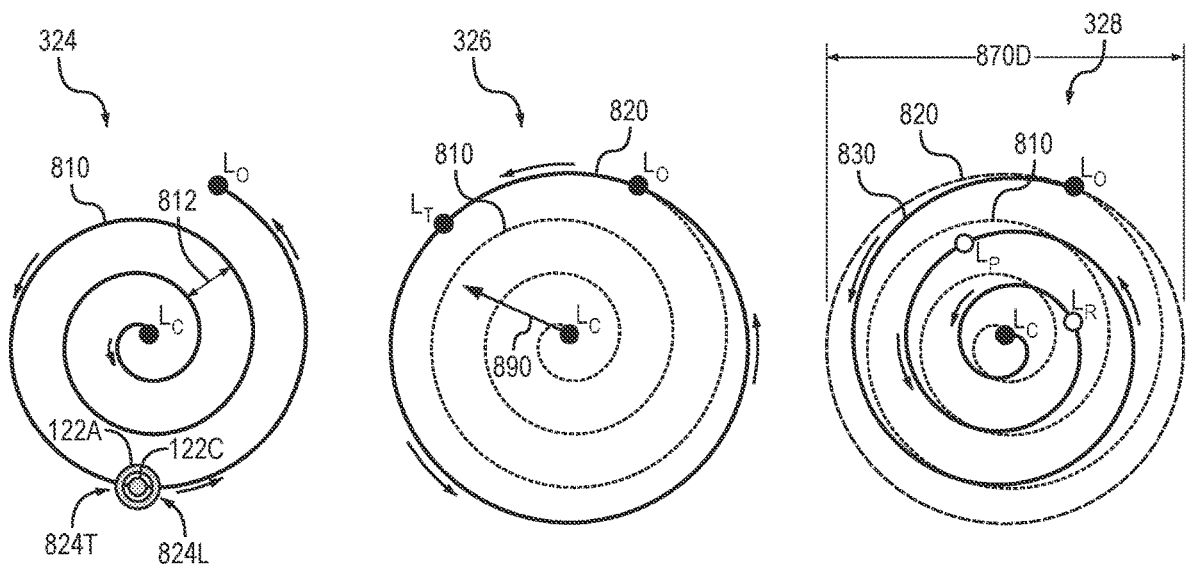
FIGS. 8A, 8B, and 8C show three paths traced by the focused dual-beam laser radiation in the method of FIG. 3, according to an embodiment.

Step 320 includes steps 324, 326, and 328, performed in the order listed. The performance of step 320 involves manipulating the powers of center beam 122C and annular beam 122A while tracing the plurality of paths. FIG. 7 shows the laser power scheme utilized in step 320, and FIGS. 8A, 8B, and 8C show three paths traced by focused laser radiation 120 in steps 324, 326, and 328, respectively. Center beam 122C and annular beam 122A may be continuous-wave beams. The powers of center beam 122C and annular beam 122A may be adjusted, as required, by center-power controller 172 and annular-power controller 174, respectively.

Step 324 traces an outward spiral path 810 shown in FIG. 8A. Outward spiral path 810 starts at a central location $L_C$ at a time $t_1$, and spirals about and away from central location $L_C$ to reach an outer location $L_O$ at a time $t_2$. In the example depicted in FIG. 8A, spiral path 810 resembles an Archimedean spiral, such that successive revolutions about central location $L_C$ are approximately equidistant and characterized by a separation distance 812. Separation distance 812 may be determined by diameter 212A of annular beam 122A and, for example, be at least as large as diameter 212A but no greater than twice diameter 212A. Without departing from the scope hereof, spiral path 810 may take on a different shape than the Archimedean spiral.

While tracing outward spiral path 810, step 324 sustains a power $P_{C1}$ of center beam 122C and a power $P_{A1}$ of annular beam 122A (see FIG. 7). $P_{A1}$ may be higher than $P_{C1}$. These powers of center beam 122C and annular beam 122A are set to be sufficient to maintain a local melt pool with a keyhole extending from the surface of the aluminum sheet on which laser radiation 120 is incident (e.g., surface 112S of metal sheet 112), through any intervening aluminum sheets if present (e.g., metal sheet 616), and into or through the aluminum part most distant from the aluminum sheet on which laser radiation 120 is incident (e.g., metal part 114). The keyhole and surrounding melt pool move with laser radiation 120 along outward spiral path 810 during step 324. The keyhole is localized to the region where laser radiation 120 is incident. The melt pool will generally have a tail behind laser radiation 120.

Conventionally, keyhole welding is performed by a single laser beam, typically with an approximately Gaussian or flat-top transverse intensity distribution. The power density of this single laser beam is set sufficiently high to form a keyhole. However, the convection mechanics of the keyhole are often so violent that significant spatter is unavoidable and the keyhole opens and closes unpredictably. Method 300, on the other hand, benefits from the presence of an annular beam to (a) control the temperature gradients imposed in the metal and (b) reduce the power-density requirements to the center beam. When tracing outward spiral path 810 with laser radiation 120, a portion 824L of annular beam 122A leads center beam 122C, and another portion 824T of annular beam 122A trails center beam 122C. Leading portion 824L pre-heats the material, such that the keyhole is established and maintained with relative ease. The heating provided by trailing portion 824T serves to more gently lower the temperature of the material behind the keyhole to reduce temperature gradients trailing the keyhole and minimize stress in the cooled material. Method 300 thereby achieves a stable keyhole with very little or no material lost through spatter and with minimal stress. The improved keyhole stability achieved by method 300 helps release gas entrapped in the aluminum, since entrapped gas can escape via the keyhole only when the keyhole is open.

We have found that step 324 alone is insufficient to achieve a satisfactory weld joint between the aluminum parts when one or more of the parts contain substantial amounts of trapped gas. If step 324 is not accompanied by additional welding, gas remains entrapped in the melted material, typically resulting in the final weld nugget having substantially sized voids as well as related stress-induced cracks. Similarly, we have found step 324 alone to be insufficient for welding together aluminum parts of dissimilar compositions. Here, the single pass along outward spiral path 810 does not provide sufficient mixing, and the weld nugget therefore tends to crack upon cooling. Therefore, method 300 further includes step 328. Step 328 traces an inward spiral path 830, shown in FIG. 8C, back toward central location $L_C$. However, since the tracing of outward spiral path 810 in step 324 leaves the material at an elevated temperature, the material would get too hot if step 328 was initiated immediately upon concluding step 324 and with the same power levels. Spatter would likely be unavoidable. To prevent such overheating, step 328 (a) starts at reduced power levels and (b) is separated from step 324 by step 326 that irradiates an area that is peripheral to the spiral paths of steps 324 and 328.

Step 326 traces an outer path 820, shown in FIG. 8B, between times $t_2$ and $t_3$. Outer path 820 starts at outer location $L_O$ at time $t_2$. Outer path 820 is peripheral to outward spiral path 810, as viewed radially from central location $L_C$. (FIG. 8B shows an example of a radial direction 890.) While tracing outer path 820, step 326 ramps down the powers of center beam 122C and annular beam 122A from powers $P_{C1}$ and $P_{A1}$, respectively, to powers $P_{C2}$ and $P_{A2}$, respectively (see FIG. 7). $P_{C2}$ and $P_{A2}$ are both lower than $P_{C1}$. $P_{C2}$ and $P_{A2}$ may be zero.

In one implementation, outer path 820 includes a closed path, for example a circle as shown in FIG. 8B. In this implementation, step 326 may further serve to ensure that the weld nugget formed by method 300 has a well-defined perimeter of a desired shape. Step 326 may trace this closed loop once, in which case outer path 820 starts and ends at outer location $L_O$. Alternatively, step 326 performs more than one circuit about central location $L_C$ along the closed loop, in which case outer path 820 ends at either outer location $L_O$ or another termination point $L_T$ on the closed loop. When sufficient, a single circuit along the closed loop minimizes the overall processing time in this implementation.

In another implementation, outer path 820 is an open path that ends at termination point $L_T$ before completing a full circuit about central location $L_C$. In this implementation, the location of termination point $L_T$ may be defined by the time it takes to ramp the powers of center beam 122C and annular beam 122A to $P_{C2}$ and $P_{A2}$, respectively. Termination of outer path 820 before completing a full circuit results in a smaller weld nugget, which may be preferred in some scenarios.

Without departing from the scope hereof, outer path 820 may be a continuation of outward spiral path 810, corresponding to step 326 ramping down the laser powers at the outer end of an extended version of outward spiral path 810.

Step 328 is initiated at time $t_3$ and traces inward spiral path 830 back to central location $L_C$, as shown in FIG. 8C. The geometrical properties of inward spiral path 830 may be similar to those of outward spiral path 810. Inward spiral path 830 starts where outer path 820 ends. Thus, inward spiral path 830 starts either at outer location $L_O$ (as depicted in FIG. 8C) or at termination point $L_T$. The process of tracing inward spiral path 830 takes place in three segments: (1) a first segment from outer location $L_O$ (or termination point $L_T$) at time $t_3$ to a location $L_P$ at time $t_4$, (2) a second segment from location $L_P$ at time $t_4$ to a location $L_R$ at time $t_6$, and (3) a third segment from location $L_R$ at time $t_5$ to central location $L_C$ at time $t_6$. While tracing the first segment, step 328 ramps up the power of center beam 122C and annular beam 122A from $P_{C2}$ and $P_{A2}$, respectively, to powers $P_{C3}$ and $P_{A3}$, respectively (see FIG. 7). In the example depicted in FIG. 7, $P_{C3}$ exceeds $P_{C2}$, and $P_{A3}$ exceeds both $P_{A2}$ and $P_{C3}$. However, other relationships may be advantageous in some scenarios. Next, while tracing the second segment, step 328 (a) sustains power $P_{A3}$ of annular beam 122A and (b) repeatedly pulses center beam 122C between $P_{C3}$ and a lower power $P_{C4}$ (see FIG. 7). $P_{C4}$ may be an off-power, i.e., zero watts. The pulsing rate of center beam 122C may be in the range between 0.5 and 5 kilohertz. Finally, while tracing the third segment, step 328 reduces the powers of center beam 122C and annular beam 122A. In one embodiment of this power reduction, step 328 turns off center beam 122C and ramps annular beam 122A down to zero watts (see FIG. 7). When $P_{C4}$ is non-zero, step 328 may turn off center beam 122C by (a) switching its power to zero watts, for example upon initiating the third segment, or (b) ramping down its power to zero watts during the tracing of the third segment. Without departing from the scope hereof, step 328 may conclude with a non-zero power in annular beam 122A, for example 20% or less than $P_{A3}$.

The pulsing of center beam 122C during the second segment of inward spiral path 830 has proved effective for releasing gas trapped in the melted material after the tracing of outward spiral path 810 in step 324. The ramp-down of annular beam 122A, as opposed to an abrupt turn-off, serves to slow cooling of the material to release stress and prevent cracking of the weld nugget. We have found that ramping down the power while laser radiation 120 is stationary tends to produce a hole or divot in the weld nugget. Therefore, step 328 performs the final ramp-down of laser radiation 120 while moving along inward spiral path 830.

Step 320 may further include a step 322 that precedes step 324. At a time $t_0$, step 322 turns on laser radiation 120 at central location $L_C$ at initial powers $P_{C0}$ and $P_{A0}$ of center beam 122C and annular beam 122A, respectively. $P_{A0}$ may exceed $P_{C0}$. From time $t_0$ to time $t_1$, while keeping laser radiation 120 directed to central location $L_C$, step 322 ramps down the powers of center beam 122C and annular beam 122A to $P_{C1}$ and $P_{A1}$, respectively. The energy deposited by laser radiation 120 in step 322 helps form the melt pool and establish the keyhole. Embodiments that omit step 322 initially turn on laser radiation 120 in step 324 with powers $P_{C1}$ and $P_{A1}$ of center beam 122C and annular beam 122A, respectively.

In one embodiment, the duration of step 324 is between 150 and 300 milliseconds, the duration of step 326 is between 25 and 100 milliseconds, the duration of step 328 is between 150 and 300 milliseconds, and the duration of step 322 (if included) is between 25 and 100 milliseconds. Method 300 may be completed in less than one second. In certain implementations, each of $P_{C0}$, $P_{A0}$, $P_{C1}$, $P_{A1}$, $P_{C3}$, and $P_{A3}$ exceeds a kilowatt of average power. For example, $P_{C0}$, $P_{A0}$, $P_{C1}$, $P_{A1}$, and $P_{A3}$ may be in the range between 2 and 4 kilowatts, $P_{C3}$ may be in the range between 0.5 and 2.5 kilowatts, and $P_{C2}$, $P_{C4}$, and $P_{A2}$ may be in the range between zero and 0.2 kilowatts. The power levels may be tuned according to the thicknesses of the involved aluminum parts and based upon whether the resulting weld nugget should penetrate the most-distant aluminum part or rather terminate at an interior location thereof.

Method 300 may include providing a shield gas to the weld zone to further help prevent pores in the top layer of the weld nugget (e.g., nearest surface 112S), to prevent plasma formation, and minimize exposure to ambient oxygen. The shield gas is, for example, argon or nitrogen.

Paths 810, 820, and 830 connect to form a single continuous path. Step 320 may trace each of paths 810, 820, and 830 in clockwise or counter-clockwise directions. The direction does not need to be the same for each path. For example, inward spiral path 830 may be identical to outward spiral path 810, but traced in reverse and in the inward rather than outward direction. The area traced by the combination of paths 810, 820, and 830 may have a general extent, e.g., a diameter 870D as shown in FIG. 8C, in the range between 3 and 15 millimeters.

FIG. 9 is a flowchart for one method 900 for joining metal parts that include a coating at an interface therebetween. Method 900 may be performed by apparatus 100. Method 900 may be used to weld zinc-coated steel or nickel-coated copper.

The presence of a coating at the interface between metal parts to be welded presents a challenge when the coating evaporates at the temperatures lower than the temperatures required to melt the metal parts themselves. For example, the melting temperature of steel is typically around 1370 degrees Celsius, whereas the evaporation temperature of zinc is only 907 degrees Celsius. In the absence of an efficient gas escape route, the gas produced by evaporation of the coating causes significant spatter during keyhole welding. In conventional keyhole laser welding of such coated metal parts, the metal parts are separated from each other by a gap that is large enough to provide an alternative escape route for the gas. Method 900 does not require such a gap. Instead, method 900 is tailored to allow gas, produced by coating evaporation, to escape efficiently via the keyhole with minimal (or no) spatter. Method 900 is therefore capable of minimizing spatter and thus achieving a high-quality weld joint when the metal parts are in direct contact with each other. We have found that method 900 also minimizes spatter and achieves a high-quality weld joint when the parts are separated from each other by some amount of gap. In the case of zinc-coated steel, we have found that the weld-joint quality is insensitive to the existence of a gap as long as the gap is relatively small. Even without modifying any process parameters according to the gap size, the same weld-joint quality is achieved for small gaps and no gap. Since the keyhole tends to force molten metal from the top sheet (closer to the incoming laser radiation) onto the sheet or part below, the thickness of the top sheet is the primary factor defining the maximum gap size to which the weld-joint quality is insensitive. In certain scenarios, the weld-joint quality is insensitive to the gap size, as long as the gap is in the range between zero (no gap) and about 60% of the thickness of the top sheet.

Method 900 includes steps 910 and 920. Step 910 focuses laser radiation 120 onto a stack of metal parts. The stack of metal parts consists of a first metal sheet disposed on a metal part, optionally with one or more intervening metal sheets disposed therebetween. The metal part may or may not be a metal sheet. Step 920 controls laser radiation 120, as focused, to trace at least one path on the first metal sheet so as to weld the first metal sheet to the metal part (and the intervening metal sheet(s), if present). This welding causes evaporation of coatings disposed in the pathway of laser radiation 120, including coatings at interfaces between the metal parts.

FIGS. 10 and 11 illustrate example configurations of metal sheets/parts that may be welded by method 900. Within the context of method 900, each metal sheet/part is made of steel optionally coated by zinc or a zinc alloy, or each metal sheet/part is made of copper or a copper alloy optionally coated by nickel or a nickel alloy. Without departing from the scope hereof, surfaces may exhibit some degree of oxidization and/or contamination prior to welding.

FIG. 10 illustrates a configuration 1000 with a two-layer stack. Configuration 1000 is similar to configurations 400 and 500, except that (a) at least one of metal sheet 112 and metal part 114 has a coating thereon at interface 414F and (b) a gap 1010G may exist at interface 414F. Metal sheet 112 has a coating 1012C at the surface of metal sheet 112 facing interface 414F, and/or metal part 114 has a coating 1014C at the surface of metal part 114 facing interface 414F. Other surfaces of metal sheet 112 and metal part 114 may be coated as well. In a typical scenario, all surfaces of at least one of metal sheet 112 and metal part 114 are coated. Gap 1010G may be in the range between zero (no gap) and one millimeter, or between zero and 60% of the thickness of metal sheet 112.

Weld nuggets formed by method 900 may have dimensions similar to those formed by method 300. The weld nuggets (not shown in FIG. 10) may penetrate metal part 114 in a manner similar to weld nugget 550 of FIG. 5, or terminate in an interior portion of metal part 114 in a manner similar to weld nugget 450 of FIG. 4.

FIG. 11 illustrates a configuration 1100 that includes intervening metal sheet 616 between metal sheet 112 and metal part 114. Configuration 1100 is similar to configuration 600 except that (a) at least one of metal sheet 112, metal sheets(s) 616, and metal part 114 has a coating at a corresponding interface and (b) a gap may exist at one or more of interfaces 616F and 614F. With respect to coatings, metal sheet 112 may have coating 1012C at interface 616F, metal sheet 616 may have one or both of a coating 1116C(1) at interface 616F and a coating 1116C(2) at interface 614F, and metal part 114 may have coating 1014C at interface 614F. Each of interfaces 616F and 614F may be configured with a gap similar to gap 1010G of FIG. 10. Configuration 1100 is readily extended to include more than one intervening metal sheet 616.

The weld nuggets formed by method 900 in configuration 1100 (not shown in FIG. 11) may penetrate metal part 114 in a manner similar to weld nugget 550 of FIG. 5, or terminate in an interior portion of metal part 114 in a manner similar to weld nugget 650 depicted in FIG. 6.

Referring again to FIG. 9, in one example of step 910, laser source 170 generates laser radiation 120, and beam delivery module 180 focuses laser radiation 120, including center beam 122C and annular beam 122A, onto surface 112S of metal sheet 112 as arranged in any one of the configurations discussed above in reference to FIGS. 10 and 11. In an example of step 920, beam delivery module 180 steers laser radiation 120 to trace at least one path on surface 112S with center beam 122C and annular beam 122A. The performance of step 920 involves manipulating the powers of center beam 122C and annular beam 122A while tracing the at least one path. The powers of center beam 122C and annular beam 122A may be adjusted, as required, by center-power controller 172 and annular-power controller 174, respectively. Center beam 122C and annular beam 122A may be continuous-wave beams.

Step 920 includes a step 924 of tracing an inward spiral path. Step 920 may further include a step 922 that precedes step 922 and traces a closed loop with laser radiation 120. The closed loop surrounds the inward spiral path and ends at the starting point for the inward spiral path. Thus, when step 920 includes step 922, the closed loop and the inward spiral path form one continuous path.

Figure 12:
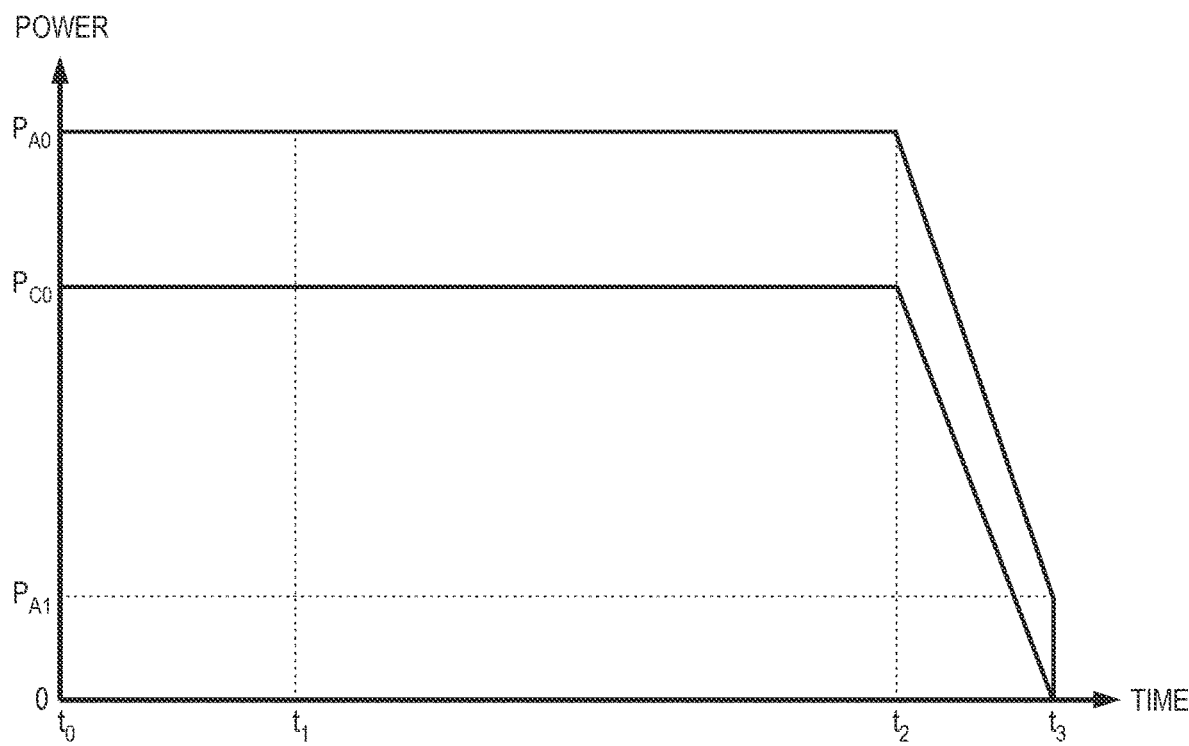
FIG. 12 shows a laser power scheme utilized in the method of FIG. 9, according to an embodiment.
Figure 13:
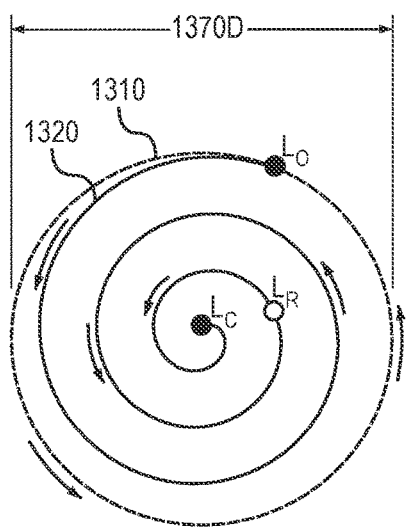
FIG. 13 shows paths traced by the focused dual-beam laser radiation in the method of FIG. 9, according to an embodiment.

FIG. 12 shows the laser power scheme utilized in an embodiment of step 920 that includes step 922. FIG. 13 shows paths traced by focused laser radiation 120 in steps 922 and 924.

Step 924 traces an inward spiral path 1320. Inward spiral path 1320 is similar to inward spiral path 830 of FIG. 8C. Inward spiral path 1320 starts at outer location $L_O$ at a time $t_1$, and spirals about and toward central location $L_C$ to reach central location $L_C$ at a time $t_3$. The process of tracing inward spiral path 1320 takes place in two segments: (1) a first segment from outer location $L_O$ at time $t_1$ to a location $L_R$ at a time $t_2$, and (2) a second segment from location $L_R$ at time $t_2$ to central location $L_C$ at time $t_3$. While tracing the first segment, step 924 sustains the powers of center beam 122C and annular beam 122A at powers $P_{C0}$ and $P_{A0}$, respectively. $P_{A0}$ may be greater than $P_{C0}$, as depicted in FIG. 12. Next, while tracing the second segment, step 924 ramps down the powers of center beam 122C and annular beam 122A to zero and a non-zero power $P_{A1}$, respectively. Finally, when reaching central location $L_C$ at time $t_3$, step 924 turns off annular beam 122A.

Powers $P_{C0}$ and $P_{A0}$ of center beam 122C and annular beam 122A, respectively. are set to maintain a local melt pool with a keyhole extending from the surface of the first metal sheet (e.g., surface 112S of metal sheet 112), through any intervening metal sheets if present (e.g., metal sheet 616), and into or through the most-distant metal part (e.g., metal part 114). As discussed above in reference to step 324 of method 300, the keyhole and surrounding melt pool moves with laser radiation 120 along inward spiral path 1320 during step 924. By virtue of including both center beam 122C and annular beam 122A, method 900 achieves a stable keyhole with very little or no material lost through spatter, as discussed above in reference to method 300. The improved keyhole stability achieved by method 900 helps release gas entrapped in the metal and provides an efficient escape route for gas generated by the evaporation of any coatings at interfaces in the metal stack. When method 900 is applied to copper or copper alloys, the presence of annular beam 122A may have an additional benefit, namely that the preheating provided by leading portion 824L of annular beam 122A induces a phase transition in the copper/copper alloy to a state characterized by a higher level of absorption of laser radiation 120. Annular beam 122A thereby further reduces the power requirements to center beam 122C. The gentle ramp-down of laser powers while tracing the second segment of inward spiral path 1320 serves to slow cooling of the material to release stress and prevent cracking of the weld nugget. This power ramp-down is performed while laser radiation 120 is moving along inward spiral path 1320, as opposed to being stationary, in order to prevent forming a hole or divot in the weld nugget as discussed above in reference to step 328 of method 300.

When included, step 922 traces a closed loop 1310 between a time to and time $t_1$. Closed loop 1310 is peripheral to inward spiral path 1320. Closed loop 1310 ends at outer location $L_O$ and may be a circle. Step 922 completes at least one full circuit of closed loop 1310. Closed loop 1310 may revolve around central location $L_C$ in the same direction as inward spiral path 1320 (as shown in FIG. 13) or in the opposite direction. Step 922 primarily serves to ensure a well-defined perimeter of the weld nugget formed by method 900. When such a perimeter is not required, it may be advantageous to omit step 922, for example to achieve a smaller weld nugget when subject to spatial constraints or to minimize the overall processing time.

Powers $P_{C0}$ and $P_{A0}$, applied by method 900, may be in the range between 1.5 and 5 kilowatts, while $P_{A1}$ may be in the range between 0.05 and 1.0 kilowatts. The area traced by inward spiral path 1320 and closed loop 1310 (if included) may have a general extent, e.g., a diameter 1370D as shown in FIG. 13, in the range between 3 and 15 millimeters. Method 900 may be completed in less than 500 milliseconds, with the duration of the power ramp-down portion of step 924 being in the range between 30 and 100 milliseconds. The portion step 924 performed with steady laser powers (between times $t_1$ and $t_2$) may take up between 60 and 100 percent of the processing time preceding the power ramp-down.

Method 900 may include providing a shield gas to the weld zone to further help prevent pores in the top layer of the weld nugget. The shield gas may be nitrogen.

The present invention is described above in terms of a preferred embodiment and other embodiments. The invention is not limited, however, to the embodiments described and depicted herein. Rather, the invention is limited only by the claims appended hereto.

What is claimed is:

1. A laser welding method for joining aluminum, comprising steps of:
   focusing laser radiation onto a first aluminum sheet disposed on an aluminum part, the laser radiation including a center beam and an annular beam surrounding the center beam; and
   controlling the focused laser radiation to trace a plurality of paths on the first aluminum sheet so as to weld the first aluminum sheet to the aluminum part, the controlling step including:
      tracing an outward spiral path while sustaining respective first powers of the center and annular beams, the outward spiral path starting at a central location and spiraling about and away from the central location,
      after tracing the outward spiral path, tracing an outer path while ramping down powers of the center and annular beams from the respective first powers to respective second powers, the outer path being peripheral to the spiral path as viewed from the central location, and
      after tracing the outer path, tracing an inward spiral path toward the central location while first (a) ramping up the powers of the center and annular beams from the respective second powers to respective third powers, subsequently (b) sustaining the third power of the annular beam and repeatedly pulsing the center beam between its third power and a lower fourth power, and finally (c) reducing the power of the center beam and annular beam.

2. The method of claim 1, wherein the reducing step turns off the center beam and ramps down the power of the annular beam from the third power.

3. The method of claim 2, wherein the reducing step ramps down the power of the annular beam to zero.

4. The method of claim 1, wherein the aluminum part is a second aluminum sheet.

5. The method of claim 1, wherein the outer path includes a closed loop that completes at least one full circuit about the central location.

6. The method of claim 1, wherein the outer path is an open path that does not complete a full revolution about the central location.

7. The method of claim 1, wherein aluminum melting caused by the controlling step terminates at a depth that is within an interior portion of the aluminum part.

8. The method of claim 1, wherein at least one of the first aluminum sheet and the aluminum part is cast aluminum or a cast aluminum alloy.

9. The method of claim 8, wherein the first aluminum sheet is extruded aluminum or an extruded aluminum alloy and the aluminum part is cast aluminum or a cast aluminum alloy.

10. The method of claim 1, wherein:
    one or more intervening aluminum sheets are disposed between the first aluminum sheet and the aluminum part, and
    the controlling step welds together the first aluminum sheet, the intervening aluminum sheets, and the aluminum part.

11. The method of claim 1, wherein the controlling step further comprises, at the central location and prior to tracing the outward spiral path, ramping down the powers of the center and annular beams from respective initial powers to the respective first powers.

12. The method of claim 1, wherein each of the first, second, and third powers of the annular beam exceeds the corresponding one of the first, second, and third powers of the center beam.

\* \* \* \* \*